United States Patent [19]

Sherwood, Jr. et al.

[11] Patent Number: 5,209,840

[45] Date of Patent: May 11, 1993

[54] SEPARATION OF ACTIVE CATALYST PARTICLES FROM SPENT CATALYST PARTICLES BY AIR ELUTRIATION

[75] Inventors: David E. Sherwood, Jr., Port Arthur, Tex.; Johnnie R. Hardee, Jr., Arkadelphia, Ark.; John A. Lemen, Port Arthur, Tex.

[73] Assignee: Texaco Inc., White Plains, N.Y.

[21] Appl. No.: 769,697

[22] Filed: Oct. 2, 1991

[51] Int. Cl.$^5$ .............. C10G 45/08; B01J 38/72; B01J 38/56; B07B 7/00

[52] U.S. Cl. .............. 208/210; 208/52 CT; 208/216 R; 209/2; 209/20; 209/138; 209/471; 502/21; 502/26; 502/29; 502/30; 502/31; 502/34; 502/41; 502/516

[58] Field of Search ............ 502/31, 29, 30, 26, 502/22, 516, 21; 208/52 CT, 210, 216

[56] References Cited

U.S. PATENT DOCUMENTS

| | | | |
|---|---|---|---|
| 2,567,207 | 9/1951 | Hoge | 208/52 CT |
| 2,631,981 | 3/1953 | Watson et al. | 502/21 |
| 3,754,964 | 8/1973 | Seuret et al. | 252/301.24 |
| 3,809,644 | 5/1974 | Johnson et al. | 208/210 |
| 4,057,491 | 11/1977 | Bushnell et al. | 208/321 |
| 4,287,088 | 9/1981 | Sirkar | 502/22 |
| 4,311,583 | 1/1982 | Woodle | 208/312 |
| 4,325,818 | 4/1982 | Woodle | 208/326 |
| 4,454,240 | 6/1984 | Ganguli | 502/26 |
| 4,621,069 | 11/1986 | Ganguli | 502/26 |
| 4,720,473 | 1/1988 | Welch et al. | 502/21 |
| 4,795,726 | 1/1989 | Schaper et al. | 502/26 |
| 4,853,103 | 8/1989 | Harandi | 208/58 |

FOREIGN PATENT DOCUMENTS

1159402 12/1983 Canada .......................... 209/68

OTHER PUBLICATIONS

M. D. Guillen, et al., Study of the Effectiveness of 27 Organic Solvents in the Extraction of Coal Tar Pitches, "Energy and Fuels," vol. 5, 1991, pp. 188-192.

*Primary Examiner*—Paul E. Konopka
*Attorney, Agent, or Firm*—Jack H. Park; Kenneth R. Priem; Richard A. Morgan

[57] ABSTRACT

Spent hydrotreating catalyst having carbonaceous and metallic deposits and of regular geometric shape after being stripped of process oil is fluidized by flowing air upwardly through the catalyst at a velocity sufficient to expand the bed thereby segregating the catalyst particles into a high activity, upper, less-contaminated fraction and a lower, more-contaminated fraction and recycling the high activity fraction to a hydrotreating process. Optionally, the high activity fraction can be regenerated with carbon burnoff or rejuvenated by acid leaching followed by regeneration with carbon burnoff to further improve catalyst activity.

9 Claims, No Drawings

SEPARATION OF ACTIVE CATALYST PARTICLES FROM SPENT CATALYST PARTICLES BY AIR ELUTRIATION

BACKGROUND OF THE INVENTION

1. Field of the Invention

This invention relates to the separation and recovery of active catalyst particles from spent or used catalyst particles having carbonaceous, sulfur and metallic deposits thereon by an air elutriation process. In another aspect of this invention, the used catalyst particles or the recovered active catalyst particles are additionally regenerated by burnoff of the carbon and sulfur deposits under controlled conditions in the presence of an oxygen-containing gas. This regeneration step may be preceded or followed, if desired, by a rejuvenation step in which a part, or substantially all, of the metallic deposits are removed. The active catalyst particles recovered can be recycled to a catalytic reactor, such as an H-Oil ® reactor of a hydrotreating process system.

During catalytic reaction processes, as exemplified by, for example, hydrotreating processes utilizing ebullated-bed reactors, the catalysts employed gradually are deactivated by virtue of various metallic elements such as vanadium, nickel, etc. being deposited thereon and by virtue of an accumulation of carbonaceous deposits on the catalyst particles. The catalyst bed in an ebullated-bed reactor from which periodic or continuous withdrawal of portions of used catalyst and replacement of the withdrawn material with fresh catalyst is carried out the catalyst bed will contain particles which have been in the reactor for widely different periods of time. As a result, in the ebullated-bed reactor operating with periodic or continuous catalyst replacement at any given time different particles of the catalyst have widely varying amounts of deposited metals thereon and carbonaceous deposits. Particles which have been in the reactor for only a short time have a relatively low metals content and such particles still have a relatively high catalytic activity but such high activity particles are discarded in the catalyst withdrawals. Also, as the catalyst particles remain in the reactor there is a tendency of the longer catalyst extrudate particles to break thus forming shorter catalyst particles and through attrition of the catalyst under continued usage an increase in the amount of catalyst fines result which are known to contain an increased concentration of metals as compared to the longer catalyst particles.

There has been a need in the art for a practical method for conveniently recovering relatively high activity catalyst particles from spent hydrotreating catalyst withdrawn from a fluidized-bed catalyst reactor system, such as ebullated-bed or continuous-stirred-tank reactors utilized in processing high sulfur and metals-containing hydrocarbon residuum feedstocks.

2. Prior Art

Canadian Patent No. 1,159,402 discloses a process for the recovery of used contaminated catalyst according to Particle density differences by fluidization in light liquid hydrocarbon fractions boiling in the range of 200° to 450° F., such as light naphtha, kerosene, fuel oil or water. In this process which is suitable for treating used catalyst derived from fluidized- or ebullated-bed reactor systems such as H-Oil ®, involving continuous or periodic withdrawal of portions of used catalyst and their replacement with fresh catalyst low density and high density fractions of used catalyst are produced. The low density fractions of used catalyst may be regenerated by carbon burnoff after removal from the light-hydrocarbon-fluidization unit and before being returned to the reactor. The high density fraction of used catalyst is, optionally, processed for recovery of deposited metals.

U.S. Pat. No. 3,809,644 discloses a process for multiple stage hydrodesulfurization of high sulfur, metals-containing petroleum residuum stocks in a multiple stage ebullated-bed hydrogenation process where catalyst used in the final stage reaction zone is removed and introduced without any additional treatment such as carbon burnoff, etc. to the preceding reaction zone thus extending the activity and effective life of the catalyst. In this process all fresh make-up hydrogen for the process is injected into the final reaction zone so that the hydrogen sulfide in the gas leaving that reaction zone is maintained below about three mole percent, thus substantially improving the desulfurization reaction rate in that reactor. The partially deactivated catalyst backstaged from the final reactor becomes guard-type contact solids for metals removal in the preceding stage reactor or reactors. Metals removal from the residual feedstocks can be maintained at the desired level without using high reaction temperatures. This process is reported to be especially effective when three reaction zones connected in series are employed and is applicable for producing low sulfur fuel oil from feedstocks containing 2-5 weight percent sulfur and having metals content ranging from about 20 p.p.m. vanadium to as much as 600 p.p.m. vanadium.

U.S. Pat. No. 4,621,069 discloses a process for effective regeneration of used catalyst to remove deposited carbon and sulfur compounds by staged controlled burnoff and in this process the burnoff is accomplished by staged burnoff in multiple zones wherein the used particulate catalyst is introduced into a first zone where the catalyst is contacted at 300°-500° F. with an inert gas for 1-2 hours residence time to evaporate liquid components from the catalyst; the oil-free catalyst is then passed to a second zone wherein the catalyst in a thin bed is contacted at 780°-800° F. with a gas containing 0.5 to 1.0 V % oxygen in an inert gas for 4-6 hours residence time; the partially regenerated catalyst is passed to a third zone where the catalyst in a thin bed is contacted with a gas containing 1-2 V % oxygen in an inert gas at a temperature of 800°-850° F. for 4-6 hours residence time and finally the further regenerated catalyst is passed to a fourth zone where the catalyst is contacted at 800°-850° F. with a gas containing 2-6 V % oxygen in an inert gas for 6-10 hours residence time to complete burnoff of carbon and sulfur deposits from the catalyst.

U.S. Pat. No. 4,720,473 discloses a process for treating a spent hydrotreating catalyst having an L/D greater than one by (1) stripping volatilizable hydrocarbons to form free-flowing catalyst particles, (2) passing the free-flowing catalyst particles to a rotating drum length grading unit having indentations in the cylindrical wall where the catalyst particles with a length less than $L_1$ are separated from the desired catalyst particles having a length greater than $L_1$ comprising lightly contaminated particles and more heavily contaminated catalyst particles (Product A), (3) passing the Product A to a density grading unit utilizing gas suspension on a vibrating air table wherein the lightly metals contaminated catalyst particles are separated from Product A.

In this density grading step the lightly metals contaminated catalyst particles become suspended in a gas above the more heavily metals contaminated catalyst particles, the more heavily metals contaminated particles are caused to move upwardly along an inclined vibrating surface and are collected at a first density grading unit outlet, the lightly contaminated catalyst particles which contact a lower portion of the vibrating surface are collected at a second density grading unit outlet. In a final step the lightly metals contaminated catalyst particles are passed to a regeneration zone in which carbonaceous deposits are removed in a controlled burnoff in the presence of an oxygen-containing inert gas at a temperature of about 200° to 700° C. Alternatively, the lightly-contaminated catalyst particles from the density grading zone can be passed to a rejuvenation zone where the catalyst particles are acid leached to remove undesired metals from the catalyst particles which are then passed to a regeneration zone.

U.S. Pat. No. 4,454,240 discloses a catalyst regeneration process which includes a metal contaminants removal step. This procedure is particularly useful for recovering used catalyst from fluidized-bed catalytic reaction systems such as H-Oil ® and H-Coal ® hydrogenation processes using ebullated-bed reactors, from fixed-bed catalytic reaction systems, and also from fluid catalytic cracking (FCC) processes. Preferred feedstocks for the reactor processes are from petroleum and coal. Catalyst having contaminant metals removed and regenerated by this process is said to have activity essentially equal to fresh catalyst. In the process of this patent the used catalysts are first washed with a hydrocarbon solvent such as naphtha, toluene and mixtures thereof, etc. to remove process oils; the oil-free catalyst is then contacted for at least 5 minutes with an aqueous solution of sulfuric acid and an ammonium ion at a temperature of from 60°-250° F. which converts the metal contaminants to the respective soluble sulfate compounds; the metals-laden solution is drained off; the treated catalyst is washed with water to remove the residual aqueous solution and, in a final step, the washed, treated catalyst is subjected to a carbon burnoff in which the catalyst is contacted with a 1-6 V % oxygen in an inert gas mixture to remove carbon deposits.

U.S. Pat. No. 4,325,818 discloses a dual solvent refining process for solvent refining petroleum based lubricating oil stocks with N-methyl-2-pyrrolidone as a selective solvent for aromatic oils where a highly paraffinic oil having a narrow boiling range approximating the boiling point of N-methyl-2-pyrrolidone is employed as a backwash solvent.

U.S. Pat. No. 4,311,583 discloses a solvent refining process utilizing N-methyl-2-pyrrolidone as solvent in which primary extract is cooled to form a secondary raffinate and secondary extract and the secondary and primary raffinates are blended to produce an increased yield of product of desired quality.

U.S. Pat. No. 4,057,491 discloses a process for recovering N-methyl-2-pyrrolidone from the raffinate and extract phases produced by its use in hydrocarbon extraction processes such as in a lube oil extraction process.

Guillen et al., in a paper entitled, "Study of the Effectiveness of 27 Organic Solvents in the Extraction of Coal Tar Pitches" (Energy and Fuels, 1991, Vol. 5, pp. 192-204) disclose a study of the extractive ability of organic solvents including 2-pyrrolidone, N-methyl-2-pyrrolidone, etc. on coal tar pitches.

SUMMARY OF THE INVENTION

This invention provides a method for segregating used, contaminated catalyst particles having carbonaceous deposits and variable metals contaminant contents so that a portion of used catalyst material having a relatively high activity can be readily recovered for further use in a petroleum residua hydroconversion process.

Specifically, this invention relates to a process for treating spent hydrotreating catalyst which is particularly useful for separating active catalyst particles from spent hydrotreating catalyst withdrawn, for example, from an H-Oil ® reactor. The process comprises (1) sending the spent hydrotreating catalyst having carbonaceous and metallic deposits thereon to a stripping unit where, for example, the spent catalyst is deoiled by washing with a heated solvent or a solvent mixture to remove process oils and, if a solvent mixture which includes, for example, N-methyl-2-pyrrolidone, is employed, to remove asphaltene compounds from the catalyst pores as well, and then dried at low temperature (<250° F.) in air or air diluted in an inert gas or at even lower temperatures (ambient) in a vacuum thus rendering the catalyst particles free-flowing, (2) placing the free-flowing catalyst particles in a vertical column, fluidizing the catalyst bed by flowing air upwardly through the catalyst at a velocity sufficient to expand the bed at least about 25% over its settled height for sufficient time to accomplish segregation of the catalyst particles into upper less contaminated fractions and lower more contaminated fractions according to their particle density, and (3) recovering the upper fraction of the catalyst, i.e., the high activity fraction, which is suitable for returning to the hydrotreating zone. Optionally, the used catalyst particles or the high activity catalyst fraction can be passed to a regeneration zone where the carbonaceous deposits are removed by carbon burnoff or the used catalyst particles or the high activity catalyst fraction can be acid leached prior to regeneration to remove undesirable metals.

DESCRIPTION OF THE PREFERRED EMBODIMENTS

Spent hydroconversion catalyst particles suitable for use in the process of this invention preferably have a regular geometric shape. They are formed by extrusion or pelletizing and preferably have a generally cylindrical shape with a generally circular cross-section. The preferred shaped catalyst particles have a cross-sectional diameter ranging from about 0.030 to about 0.065 inches and preferably from about 0.035 to about 0.041 inches. Generally, the length of the catalyst extrudate particles will range up to about 0.6 inches or more.

Catalyst-type particles which can be treated by the process of this invention comprise any of the conventional catalysts used in hydroconversion and hydrorefining of hydrocarbons and particularly with regard to hydrotreating of residuum feedstocks which usually contain active metals such as cobalt, molybdenum, nickel, phosphorus, tungsten and titanium supported on, for example, shaped alumina or silica-alumina supports. These active metals are generally in oxide form before and in a sulfide form after use in a hydrotreating reactor.

Although the process of this invention is useful for treating spent catalyst withdrawn from a wide range of hydrotreating reactors including hydrodesulfurization units, this catalyst treatment process is especially useful for treating spent catalyst withdrawn, for example, an ebullated-bed single stage hydrodesulfurization unit or from any of the stages of a multiple-stage hydrodesulfurization ebullated-bed unit where catalysts comprising an oxide of nickel or cobalt and an oxide of tungsten or molybdenum supported on a porous alumina support are employed as fresh catalyst.

THE PROCESS OF THIS INVENTION

(A) Removal of Process Oils to Form Free-Flowing Catalyst Particles

In the process of this invention spent hydrodesulfurization catalyst which has been removed from an ebullatedbed reactor, such as an H-Oil ® reactor, operating under hydrodesulfurization conditions is sent to a catalyst stripping unit for deoiling. In this unit the spent catalyst particles, for example, are washed or contacted batchwise or in a continuous manner with a hydrocarbon solvent liquid for the purpose of removing process oils A variety of methods may be utilized in washing, i.e., deoiling, the used catalyst such as by (a) adding the used catalyst with mixing to a tank containing the solvent liquid, or (b) the spent catalyst can be introduced into a catalyst washing unit where solvent is circulated uniformly upwardly through a generally vertical column by means of a pump and a flow distributor. In both washing methods the hydrocarbon solvent can be, for example, kerosene, naphtha, toluene, pentane, etc., and mixtures thereof. Heat is added to the hydrocarbon solvent to maintain the solvent temperature at about 150°-300° F. in both methods (a) and (b).

A particularly useful solvent comprises a mixture of about 5 to about 35% by weight of N-methyl-2-pyrrolidone with the balance being a light hydrocarbon such as toluene, naphtha, pentane, kerosene, mixtures thereof, etc. Such solvent mixtures are not only highly effective in removing process oils but also are effective for removing asphaltene compounds from the catalyst pores with a resulting increase in catalyst desulfurization activity.

The solvent liquid containing the oily carbonaceous material which is recovered from the washing or contacting unit is sent to a recovery unit where the solvent is recovered for recycling back to the washing unit, while the oily, carbonaceous waste is sent as a portion of the feed to a hydrogen generation unit to produce hydrogen for use in a hydrotreating unit or sent to a coking unit for light hydrocarbon production.

Generally, the deoiling step is conducted at atmospheric pressure and the deoiling operation can also be carried out in a continuous manner. Usually, the amount of solvent utilized will vary from about 20 to about 80 pounds or more per pound of used catalyst being treated to remove process oils, i.e., deoiling.

After the spent catalyst particles have been washed, free-flowing catalyst particles are obtained by drying the particles at a low temperature (i.e., <250° F.) in air or in air diluted with an inert gas such as nitrogen or at even lower temperatures (ambient) under vacuum conditions.

(B) Separation of High Activity Catalyst Particles From Spent Catalyst Particles Using Air Elutriation In this process spent alumina-supported hydrotreating catalyst particles withdrawn from a hydrotreating reactor such as an H-Oil ® reactor, after stripping to remove process oils, drying and optionally regenerating, are introduced into a fluidization or elutriation unit which can be, for example, a single, generally vertical tube or column. Air or an inert gas or mixtures thereof at a temperature of about ambient to about 250o F. is circulated uniformly upwardly by means of a pump and a distributor at a velocity sufficient to expand the catalyst bed at least about 25% to about 200% of its settled height so that a fluidization and segregation of the catalyst particles according to their density results. The preferred catalyst bed expansion ranges from about 35% to about 120% of the settled height. During the fluidization period which ranges from about 0.03 to about 6.0 hours or more, the catalyst is segregated into light weight, high activity, less contaminated catalyst particles in the upper portion of the column and heavier, more contaminated particles in the lower portion of the column. The time required to complete the desired segregation of the catalyst particles will vary over a wide range depending on the density range of the catalyst particles, the size of the catalyst particles, the degree of catalyst bed expansion, the temperature of the air entering the column, etc. The length to diameter ratio of the column should be at least about 4 up to about 60/1 with the ratio preferably being between 10 to 40/1 and most preferably being between 20 to 35/1.

At the conclusion of the fluidization step, the high activity catalyst particles in the upper portion of the column are removed and then returned to the hydrotreating reactor after, optionally, being regenerated to remove carbon deposits or acid leached and regenerated to remove contaminant metals and carbon deposits, if desired. The heavier, more contaminated catalyst particles recovered from the lower portion of the column can be processed to recover deposited metals or discarded, as desired.

(C) Catalyst Regeneration

Optionally, the high activity catalyst fraction recovered from the elutriation z6ne is passed to regeneration zone for removal of carbonaceous deposits. The regeneration zone may be a conventional regenerator in which a gas containing 1-6 V % oxygen (e.g., air diluted with an inert gas such as nitrogen), or air is supplied to the regenerator under combustion conditions to oxidize the carbonaceous deposits to carbon dioxide which is withdrawn from the regenerator. Suitable oxidation temperatures range from about 700° to about 900° F.

In another embodiment of the process of the instant invention, the catalyst particles after washing and drying may be sent to a suitable regeneration zone for regeneration in the same manner as described above before the freeflowing catalyst particles are passed to the previously-described elutriation zone.

(D) Acid Leaching of Catalyst Particles

In an optional step, the high activity catalyst particles recovered after the elutriation step and prior to regeneration are sent to a rejuvenation unit for the purpose of removing metallic deposits where the catalyst particles are first preferably washed with water to fill the catalyst pores. Next, the catalyst particles are passed to an acid treating column and a 15-25 percent sulfuric solution is introduced into the lower section of the column which is made of corrosion resistant material. The acid solution is recovered from the top of the acid treating column and generally is recycled by means of a pump to the bottom of the column together with additional make-up acid as required. Usually the acid treatment is conducted at temperatures ranging from 150°-200° F. In a final step after the acid treatment to remove metallic deposits has been carried out the catalyst particles are passed to a washing unit where the acid treated particles are washed with water to remove the acid following which the recovered, washed catalyst particles are preferably dried in air or in air diluted with nitrogen at a temperature of about 150° to about 250° F. The process for removing metallic deposits from the catalyst particles is more completely described in U.S. Pat. No. 4,454,240, the disclosure of which is hereby incorporated by reference.

As previously pointed out, the alumina-based catalysts usually employed in ebullated-bed reactors operating under hydrodesulfurization conditions contain one or more metals with hydrogenating activity such as cobalt, molybdenum, nickel, phosphorus, tungsten and titanium and the regeneration and/or rejuvenation steps may result in removal of a part of the metals with hydrogenation activity from the catalysts. If needed, additional amounts of the required metals can be supplied to the reactivated catalyst particles by methods well known in the art.

In another aspect this invention relates to a hydrodesulfurization process especially useful for producing low sulfur liquid products which comprises passing a metals-containing hydrocarbon residuum feedstock having a metals content of from about 50 to about 500 wppm and a sulfur content in excess of 2.0 weight percent through multiple reaction zones in an upflow manner, with internal recycle of reactor liquid contents, under hydrogenation conditions of temperature and pressure in the presence of an alumina-supported catalyst containing one or more metals with hydrogenating activity selected from the group consisting of cobalt, molybdenum, tungsten, phosphorus, nickel and vanadium which is ebullated in the liquid environment, adding fresh particulate high activity catalyst to the final reaction zone, withdrawing spent catalyst from the final reaction zone, separating out an active fraction of the withdrawn catalyst by:

a) passing the spent catalyst particulates to a stripping unit in which process oils are removed from the spent catalyst particulates thus rendering the spent catalyst particles free flowing, b) passing said free-flowing spent catalyst particles to an air elutriation zone comprising a single generally vertical column, said vertical column having a length to diameter ratio (L/D) of at least 4 to 1, preferably between about 10 to about 40 to 1, fluidizing the catalyst bed by flowing air upwardly through the catalyst at non-reaction conditions and at a velocity sufficient to expand the bed at least about 25% over its settled height and for a time sufficient to accomplish substantial segregation of the catalyst particles into a high-activity, upper, less contaminated fraction and lower more contaminated fraction according to their particle density, c) recovering the high-activity, upper fraction catalyst from the air elutriation zone, and d) backstaging the recovered high activity, alumina-supported catalyst to said preceding reaction zones in reverse flow relative to the residuum along with, optionally, some fresh catalyst make-up as required, and introducing make-up hydrogen directly to the final reaction zone whereby the desulfurization rate is maintained at a maximum.

In another embodiment this invention relates to a two-stage hydroconversion process for the production of low-boiling range, low-sulfur product streams from a petroleum residuum feedstock having a metals content more than 50 p.p.m. and having a sulfur content in excess of 4.0 weight percent where the residuum is passed upwardly through each of the two reaction zones in succession in the presence of hydrogen and under hydrogenation/hydroconversion conditions of temperature and pressure, both of the said zones containing a particulate alumina-supported catalyst which is placed in ebullation in the liquid phase environment by the upflow of said residuum and hydrogen and the internal recycle of reactor liquid products, the improvement which comprises:

a) in the final reaction zone introducing a fresh, particulate, high activity alumina-supported hydrotreating catalyst containing one or more metals of hydrotreating activity selected from the group consisting of cobalt, molybdenum, tungsten, phosphorus, nickel and vanadium.

b) withdrawing spent catalyst particles from the final reaction zone, said spent catalyst particles being partially deactivated by metals and carbon deposited thereon in the final reaction zone, c) passing the spent catalyst particles to a stripping unit in which process oils are removed from the spent catalyst particles thus rendering the spent catalyst particles free flowing, d) passing said free-flowing spent catalyst particles to an air elutriation zone comprising a single generally vertical column, said vertical column having a length to diameter ratio (L/D) of at least 4 to 1, fluidizing the catalyst bed by flowing air upwardly through the catalyst at non-reaction conditions and at a velocity sufficient to expand the bed at least about 25% over its settled height and for a time sufficient to accomplish substantial segregation of the catalyst particles into a high-activity, upper, less contaminated fraction and lower more-contaminated fraction according to their particle density; and e) recovering the high-activity, upper fraction catalyst from the air elutriation zone, f) passing the entire effluent from the first reaction zone to the subsequent final reaction zone, g) passing the high-activity catalyst particles recovered in step (e) to the first reaction zone along with, optionally, some fresh catalyst make-up, and h) withdrawing from the final reaction zone a liquid hydrocarbon stream which can be fractionated to recover the unconverted residuum stream, i.e., the non-cracked or nonhydrocracked portion of the residuum feed, with a boiling range of greater than or equal to 1000° F. and a sulfur content of less than 3 weight percent which is suitable for blending to a low sulfur fuel oil product.

The spent, free-flowing catalyst may also, optionally, be passed to a regeneration unit to remove contaminant carbon and sulfur prior to step (d) above.

In another aspect, this invention relates to a process for deoiling spent hydrotreating catalyst particles, such as alumina-supported, hydrotreating catalyst particles which comprises washing the said catalyst particles at a temperature of about 150° to about 300° F. with a solvent comprising about 5 to about 35 weight percent of N-methyl-2-pyrrolidone with the balance being a light hydrocarbon selected from the group consisting of toluene, naphtha, pentane, kerosene and mixtures of the light hydrocarbon.

In still another aspect, this invention relates to a solvent suitable for deoiling spent, hydrotreating catalyst particles, such as alumina-supported hydrotreating catalyst particles which comprises about 5 to about 35 weight percent of N-methyl-2-pyrrolidone with the balance being a light hydrocarbon selected from the group consisting of toluene, naphtha, pentane, kerosene and mixtures of the light hydrocarbons. Especially useful is a solvent comprising about 5 to about 35 weight percent of N-methyl-2-pyrrolidone with the balance being toluene.

EXAMPLES 1 AND 2

In Example 1, a sample of about 200 cc of used, i.e., aged, extrudate catalyst particles withdrawn from the first stage of two-stage ebullated-bed reactor (Reactor F-10-R1) operating with daily catalyst withdrawal of portions of used catalyst and additions of fresh catalyst and processing residual crudes having a boiling point range such that at least 89 volume percent boils at temperatures greater than or equal to 1000° F. and having a sulfur content in excess of 2 weight percent operating under hydrodesulfurization conditions was placed in an air elutriation unit which was a 1 inch diameter quartz tube of about 36 inches in length. The catalyst treated in this example and in all the examples which follow was Criterion ® HDS-1443B, a nickel-molybdenum catalyst, on an alumina support. The used catalyst sample was, prior to being subjected to air elutriation, washed with toluene at a temperature of about 230° F. until no more oil was being removed and afterwards air dried at 250° F. to yield a free-flowing catalyst sample. After being placed in the elutriation column, it was subjected to an upward air flow sufficient to expand the bed about 100% of the settled height. After 4 hours the catalyst bed was allowed to settle, the low density particles, i.e., the top which was designated as the "light" fraction (about 50 vol. %) was removed using a spatula and the high density particles or lower fraction (about 50 vol. %), which was designated as the "heavy" fraction, was let out of the bottom of the column.

In Example 2, a sample of about 200 cc of used, i.e., aged, extrudate catalyst particles withdrawn from the second stage of a two-stage ebullated-bed reactor (Reactor F-10-R2) operating with daily catalyst withdrawal of portions of used catalyst and additions of fresh catalyst and processing the same residual crude as in Example 1, was treated in the air elutriation unit in the same manner as described above.

The V/Mo atomic ratio for the unseparated catalyst fraction, the light and the heavy fractions recovered in Examples 1 and 2 were determined and this data is set out in Table I which follows:

TABLE I

| V/Mo ATOMIC RATIO DETERMINATIONS | | | |
|---|---|---|---|
| | Vol. % | Density (lbs/ft³) | V/Mo Atomic Ratio |
| Example 1 | | | |
| Unseparated catalyst from Reactor F-10-R1 | 100 | 63 | 2.2 |
| "Light" fraction | 50 | 55 | 1.4 |
| "Heavy" fraction | 50 | 66 | 3.4 |
| Example 2 | | | |
| Unseparated catalyst | 100 | 63 | 1.2 |

TABLE I-continued

| V/Mo ATOMIC RATIO DETERMINATIONS | | | |
|---|---|---|---|
| | Vol. % | Density (lbs/ft³) | V/Mo Atomic Ratio |
| from Reactor F-10-R2 | | | |
| "Light" fraction | 49 | 56 | 0.9 |
| "Heavy" fraction | 51 | 65 | 1.5 |

Portions of the unseparated catalyst samples and the fractions recovered in Examples 1 and 2 were subsequently regenerated in air for 24 hours at 850° F.

The hydrodesulfurization activity of the unseparated catalyst samples as well as that of the low density or top fraction and the high density or bottom fraction from Examples 1 and 2 were determined after regenerating using the HDS-MAT test. The results of the HDS tests together with other properties determined for unseparated catalyst samples and the catalyst fractions of Examples 1 and 2, after regeneration, are reported in Tables II and III which follow.

TABLE II

| 50/50 VOL % SEPARATION OF F-10-R1 CATALYST PROPERTIES AFTER REGENERATION | | | |
|---|---|---|---|
| | Composite | Bottom | Top |
| Sample No. | 3346-CT-85 | 3343-CT-85 | 3344-CT-85 |
| Volume % | 100.0 | 50.0 | 50.0 |
| Density (lbs/cf, regenerated) | 50 | 57 | 46 |
| SA (M²/g, regenerated) | 201 | 157 | 211 |
| % HDS$_a$ (avg) (regenerated) | 27.0 | 20.9 | 36.4 |

$_a$ as determined by the HDS-MAT test.

TABLE III

| 50/50 VOL % SEPARATION OF F-10-R2 CATALYST PROPERTIES AFTER REGENERATION | | | |
|---|---|---|---|
| | Composite | Bottom | Top |
| Sample No. | 3348-CT-85 | 3349-CT-85 | 3350-CT-85 |
| Volume % | 100.0 | 51.3 | 48.7 |
| Density (lbs/cf, regenerated) | 46 | 47 | 42 |
| SA (M²/g, regenerated) | 223 | 188 | 233 |
| % HDS$_a$ (avg) (regenerated) | 37.9 | 31.5 | 45.0 |

$_a$ as determined by HDS-MAT test.

The data set out in Tables I and II for Example 1 and in Tables I and III for Example 2 show that the hydrodesulfurization activity of the regenerated catalyst fractions decreases as the degree of vanadium contamination of the samples, as shown by the V/Mo atomic ratio, increases.

EXAMPLES 3 AND 4

In these examples aged, spent catalyst samples derived from the first stage (Reactor F-201) and from the second stage (Reactor F-202) of a two-stage ebullated-bed reactor operating with daily catalyst withdrawal of portions of used catalyst and additions of fresh catalyst and processing residual crudes having a boiling point range such that at least 89 volume percent boils at temperatures greater than or equal to 1000° F. and having a sulfur content in excess of 4 weight percent operating under hydrodesulfurization conditions were blended together to form composites. The catalyst treated in Examples 3 and 4 was Criterion ® HDS-1443B. A sample of about 200 cc of the composite material from the Reactor F-201 and a sample of about 200 cc from Reactor F-202 were, after being washed with dehexanized raffinate gasoline, dried at low temperature (<250° F.) in a vacuum to form free-flowing materials, regenerated in air at 850° F. for 24 hours were subjected to density separation in the same air elutriation unit and under the same conditions as employed in Examples 1 and 2 above. After four hours of elutriation treatment in which the air flow was adjusted to expand the bed about 100% of the settled height, the catalyst bed was allowed to settle. The particles which had moved toward the top of the tube were designated "light" (about 25 vol. %), the particles which occupied the middle portion of the settled bed were designated "intermediate" (about 50 vol. %), and the particles which remained near the bottom of the tube were designated "heavy" (about 25 vol. %).

The V/Mo atomic ratio for the unseparated catalyst fraction and, for the light, intermediate and heavy catalyst fractions of Examples 3 and 4 were determined and the results are shown in Table IV which follows.

TABLE IV

V/Mo ATOMIC RATIO DETERMINATIONS

| | V/Mo Atomic Ratio |
|---|---|
| Example 3 | |
| Unseparated catalyst from Reactor F-201 | 3.2 |
| "Light" fraction | 1.5 |
| "Intermediate" fraction | 2.7 |
| "Heavy" fraction | 3.9 |
| Example 4 | |
| Unseparated catalyst from Reactor F-202 | 1.2 |
| "Light" Fraction | 0.7 |
| "Intermediate" fraction | 0.9 |
| "Heavy" fraction | 1.2 |

The hydrodesulfurization activity of the "light", "intermediate" and "heavy" catalyst fractions of Examples 3 and 4 were determined using the HDS-MAT test. The results of the HDS tests together with densities determined for the three recovered air-classified regenerated catalyst fractions of Examples 3 and 4 are reported in Tables V and VI which follow.

TABLE V

SEPARATION OF REGENERATED CATALYST FROM REACTOR F-201

| | Top 25 Vol % (Light) | Mid 50 Vol % (Intermediate) | Bottom 25 Vol % (Heavy) |
|---|---|---|---|
| Density, lbs/ft$^3$ | 44.2 | 51.1 | 60.0 |
| Activity Testing HDS-MAT, C 0.5 g, % | 29.1 | 19.3 | 13.8 |

TABLE VI

SEPARATION OF REGENERATED CATALYST FROM REACTOR F-202

| | Top 25 Vol % (Light) | Mid 50 Vol % (Intermediate) | Bottom 25 Vol % (Heavy) |
|---|---|---|---|
| Density, lbs/ft 3 | 41.3 | 41.4 | 47.5 |
| Activity Testing HDS-MAT, C 0.5 g. % | 38.3 | 36.3 | 28.6 |

In the HDS-MAT procedure a one-half gram of ground, calcined catalyst is presulfided with 10% $H_2S/H_2$ flowing at 50 cc/minute for one hour at 750° F. The catalyst is then exposed to a model feed and hydrogen for approximately four hours. Cuts are taken periodically and analyzed by gas chromatograph for the conversion of benzothiophene to ethylbenzene. The average hydrodesulfurization activity is reported as C 0.5 g.

The HDS-MAT run conditions are as follows:

| Temperature | 550° F. |
|---|---|
| Pressure | Atmospheric |
| Chargestock | 0.857 molar benzothiophene in ASTM reagent grade heptane (3.68 wt % S) |
| Space Velocity | 4. hr.$^{-1}$ |
| Catalyst Charge | 0.5 grams |
| Hydrogen Flow | 50 cc/min. of ultra-high purity $H_2$ |

The calculation is performed as follows:

HDS-MAT C 0.5 g. @ 550° F. = Average HDS =

$$\left( 100 \times \left( 1.0 - \frac{\text{Sulfur in product}}{\text{Sulfur in feed}} \right) \right)$$

The data of Examples 1–4 show that a high activity catalyst fraction suitable for returning to a hydrotreatment reactor can be recovered using the air elutriation process of this invention.

The experimental samples set out in this application were performed as batch operations however air classification of the used, deoiled catalyst particles can be conducted in a continuous manner where, for example, spent catalyst is continuously added to the elutriation column at about the middle of the vertical column while a fraction of the segregated light material is continuously drawn off from the column top and a fraction of the segregated heavier material is withdrawn continuously from the column bottom.

Although the experimental examples set out in this application were regenerated either prior to or after the air elutriation process of this invention, regeneration is an optional step. The low density fractions obtained from the air elutriation are low in contaminant metals and would be suitable for reuse in a hydrotreatment process.

We claim:

1. A hydrodesulfurization process which comprises passing a metals contaminated hydrocarbon residuum feedstock having a metals content of from about 50 to about 500 wppm and a sulfur content in excess of 4.0 weight percent through multiple reaction zones in an upflow manner with internal recycle of reactor liquid contents under hydrogenation conditions of temperature and pressure in the presence of an alumina-supported catalyst containing one or more metals with hydrogenating activity selected from the group comprising cobalt, molybdenum, tungsten and nickel which is ebullated in the liquid environment, adding fresh particulate high activity catalyst to the final reaction zone, withdrawing spent catalyst particles from the final reaction zone, reactivating the said spent catalyst by:

a) passing the spent catalyst particles to a stripping unit in which process oils are removed form the spent catalyst particles thus rendering the spent catalyst particles free flowing by washing with a solvent comprising about 5 to about 35% by weight of N-methyl-2-pyrrolidone with the balance being a light hydrocarbon selected from the group consisting of toluene, naphtha, pentane, kerosene and mixtures of the said light hydrocarbons at a temperature of about 150° to about 300° F. and drying the washed, free-flowing, spent hydrotreating catalyst particles at a temperature of less than 250° F. in air or air diluted with an inert gas, b) passing said free-flowing spent catalyst particles to an air elutriation zone comprising a single generally vertical column, said vertical column having a length to diameter ratio (L/D) of at least 4 to 1, fluidizing the catalyst bed by flowing air upwardly through the catalyst at non-reaction conditions and at a velocity sufficient to expand the bed at least about 25% over its settled height and for a time sufficient to accomplish substantial segregation of the catalyst particles into a high-activity, upper, less contaminated fraction and lower more contaminated fraction according to their particle density, c) recovering the high-activity, upper fraction catalyst from the air elutriation zone, and d) backstaging the recovered high activity, alumina-supported catalyst to said preceding reaction zones in reverse flow relative to the residuum and introducing make-up hydrogen directly to the final reaction zone whereby the desulfurization rate is maintained at a maximum.

2. The process of claim 1 wherein the said recovered high activity catalyst fraction before being backstaged to the said reaction zones is regenerated by contacting the said reactivated catalyst with an oxygen-containing gas at a temperature of about 700° to about 900° F. to remove carbon deposits thereby providing a regenerated catalyst.

3. The process of claim 2 wherein prior to regeneration the said recovered high activity catalyst fraction is treated at a temperature of from 60°-250° F. for at least about 5 minutes with an aqueous solution consisting of sulfuric acid and an ammonium ion whereby the metal contaminants are converted to their respective sulfate compounds and the said metal contaminants removed from the catalyst and afterwards washing the treated catalyst to remove the aqueous solution.

4. A hydroconversion process for the production of low-boiling range, low-sulfur product streams from a petroleum residuum feedstock having a metals content more than 50 p.p.m. and having a sulfur content in excess of 4.0 weight percent where the residuum is passed upwardly through each of two reaction zones in succession with internal recycle of reactor liquid products in the presence of hydrogen and under hydrogenation/hydroconversion conditions of temperature and pressure, both of the said zones containing a particulate alumina-supported catalyst which is placed in ebullation in the liquid phase environment by the upflow of said residuum and hydrogen and the internal recycle of reactor liquid products, the improvement which comprises:

a) in the final reaction zone introducing a fresh, particulate, high activity alumina-supported hydrotreating catalyst containing one or more metals of hydrotreating activity selected from the group comprising cobalt, molybdenum, tungsten and nickel, b) withdrawing spent catalyst particles from the final reaction zone, said spent catalyst particles being partially deactivated by metals deposited thereon in the final reaction zone, c) passing the spent catalyst particles to a stripping unit in which process oils are removed from the spent catalyst particles thus rendering the spent catalyst particles free flowing by washing with a solvent comprising about 5 to about 35% by weight of N-methyl-2-pyrrolidone with the balance being a light hydrocarbon selected from the group consisting of kerosene, naphtha, toluene and pentane or mixtures of said light hydrocarbons at a temperature of about 150° to about 300° F. and drying the washed, free-flowing, spent hydrotreating catalyst particles at a temperature of less than 250° F. in air or air diluted with an inert gas, d) passing said free-flowing spent catalyst particles to an air elutriation zone comprising a single generally vertical column, said vertical column having a length to diameter ratio (L/D) of at least 4 to 1, fluidizing the catalyst bed by flowing air upwardly through the catalyst at non-reaction conditions and at a velocity sufficient to expand the bed at least about 25% over its settled height and for a time sufficient to accomplish substantial segregation of the catalyst particles into a high-activity, upper, less contaminated fraction and lower more-contaminated fraction according to their particle density; and e) recovering the high-activity upper fraction catalyst particles from the air elutriation zone, f) passing the entire effluent from the first reaction zone to the subsequent final reaction zone, g) passing the high-activity catalyst particles recovered in step (e) and along with, optionally, fresh catalyst make-up as required to the first reaction zone, and h) withdrawing from the final reaction zone a liquid hydrocarbon stream which can be fractionated to recover the uncovered residuum stream with a boiling range of greater than or equal to 1000° F. ad a sulfur content of less than 3weight percent which is suitable for blending to a low sulfur fuel oil product.

5. The process of claim 4 wherein the said hydrotreating catalyst introduced into the final reaction zone contains molybdenum and nickel.

6. The process of claim 4 wherein before passing the said recovered high activity catalyst particles from the final reaction zone to the first reaction zone the said high activity catalyst particles are regenerated by contacting the said high activity catalyst particles with an oxygen-containing gas at a temperature of about 700° to about 900° F. to remove carbon deposits thereby providing a regenerated catalyst.

7. The process of claim 6 wherein prior to regeneration the said high activity catalyst particles are treated at a temperature of from 60°-250° F. for at least about 5 minutes with an aqueous solution consisting of sulfuric acid and an ammonium ion whereby the metal contaminants are converted to their respective sulfate compounds and the said metal contaminants removed from the catalyst and afterwards washing the treated catalyst to remove the aqueous solution.

8. A process for deoiling spent, hydrotreating catalyst particles which comprises washing the said catalyst particles at a temperature of about 150° to 300° F. with a solvent comprising about 5 to about 35 weight percent of N-methyl-2-pyrrolidone with the balance being a light hydrocarbon selected from the group consisting of toluene, naphtha, pentane, kerosene and mixtures of the light hydrocarbons.

9. The process of claim 8 wherein the solvent comprises about 5 to about 35 weight percent of N-methyl-2-pyrrolidone with the balance being toluene.

* * * * *